United States Patent
Tomita et al.

(10) Patent No.: US 9,258,403 B2
(45) Date of Patent: Feb. 9, 2016

(54) MOBILE TERMINAL, REPORT CONTROL METHOD, AND REPORT SYSTEM

(71) Applicants: Yosuke Tomita, Aichi (JP); Koji Takizawa, Kyoto (JP)

(72) Inventors: Yosuke Tomita, Aichi (JP); Koji Takizawa, Kyoto (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/470,692

(22) Filed: Aug. 27, 2014

(65) Prior Publication Data

US 2015/0065079 A1    Mar. 5, 2015

(30) Foreign Application Priority Data

Aug. 27, 2013    (JP) .................. 2013-175139

(51) Int. Cl.
| | |
|---|---|
| *H04W 4/04* | (2009.01) |
| *H04M 1/725* | (2006.01) |
| *H04B 1/3883* | (2015.01) |
| *H04B 5/00* | (2006.01) |
| *H04W 4/22* | (2009.01) |

(52) U.S. Cl.
CPC ......... *H04M 1/72538* (2013.01); *H04B 1/3883* (2013.01); *H04B 5/0031* (2013.01); *H04B 5/0037* (2013.01); *H04W 4/046* (2013.01); *H04W 4/22* (2013.01); *H04M 2250/12* (2013.01)

(58) Field of Classification Search
CPC .... H04M 1/72538; G01P 15/00; G01P 15/14; H04B 5/0025; H04B 5/0031; H04B 5/0037; H04W 4/22; H04W 4/046; H04W 24/00; H04W 24/10
See application file for complete search history.

(56) References Cited

U.S. PATENT DOCUMENTS

| | | | |
|---|---|---|---|
| 7,536,457 B2 * | 5/2009 | Miller | 709/224 |
| 8,135,510 B2 * | 3/2012 | Nakamura | 701/32.2 |
| 2007/0279200 A1 | 12/2007 | Morimoto | |
| 2010/0188243 A1 * | 7/2010 | Tysowski et al. | 340/669 |
| 2011/0189974 A1 * | 8/2011 | Park et al. | 455/404.2 |

FOREIGN PATENT DOCUMENTS

| | | |
|---|---|---|
| JP | 2001-250183 A | 9/2001 |
| JP | 2009-177294 A | 8/2009 |
| JP | 2013-038870 A | 2/2013 |
| WO | 2006/085380 A1 | 8/2006 |

* cited by examiner

*Primary Examiner* — Siu Lee
(74) *Attorney, Agent, or Firm* — Osha Liang LLP

(57) ABSTRACT

The mobile terminal adequately reports when the mobile terminal receives an impact due to an accident of a vehicle. When it is determined in step S1 that the mobile terminal is set on a charge pad and it is determined in step S2 that the mobile terminal is set to a normal mode, the mobile terminal is set to an automatic report mode in step S3. Meanwhile, when it is determined in step S1 that the mobile terminal is not set on the charge pad and it is determined in step S6 that the mobile terminal is set to the automatic report mode, and when a timeout time is set in step S7 and it is determined in step S10 that the timeout time passes, the mobile terminal is set to the normal mode in step S11.

11 Claims, 3 Drawing Sheets

MOBILE TERMINAL, REPORT CONTROL METHOD, AND REPORT SYSTEM

BACKGROUND OF THE INVENTION

1. Technical Field

The present invention relates to a mobile terminal, a report control method and a report system, and, more particularly, relates to a mobile terminal, a report method and a report system which automatically report an occurrence of an accident of a vehicle.

2. Related Art

Conventionally, a system which, when a vehicle receives an impact due to an accident, and a vehicle-mounted device detects an occurrence of the accident, the vehicle-mounted device causes a mobile telephone to call a specific report dial to enable the mobile telephone to automatically report the occurrence of the accident is proposed (see, for example, Japanese Patent Application Laid-Open No. 2001-250183). More specifically, when a user who carries the mobile telephone gets on the vehicle, the mobile telephone and the vehicle-mounted device perform link processing by way of Bluetooth (registered trademark), hold the linked state and stand by. Further, when the vehicle-mounted device detects an occurrence of an accident, the vehicle-mounted device transmits information related to the accident to the mobile telephone, and the mobile telephone calls a specific report dial and reports the occurrence of the accident to an accident information center.

Furthermore, conventionally, transmitting an abnormal state to a server by using a charging cradle device of a mobile telephone installed in a vehicle, and the mobile telephone is proposed (see, for example, Japanese Patent Application Laid-Open No. 2009-177294). More specifically, when the mobile telephone is set on the cradle device, the mobile telephone starts capturing images using a built-in camera, supplies captured image information to the cradle device and store the information. Further, when a built-in G sensor detects acceleration which exceeds a predetermined range, the cradle device transmits captured image information of a certain time before and after a time of this detection, to a server through the mobile telephone.

Furthermore, conventionally, automatically reporting using a mobile telephone alone without using other devices is proposed (see, for example, International Publication 2006/085380). More specifically, when detecting a certain impact or more due to an accident of a vehicle, the mobile telephone which has a shock sensor automatically reports, for example, position information to an emergency contact number.

Further, conventionally, providing a non-contact charging device of a mobile telephone in a vehicle is proposed. Furthermore, issuing a warning that the mobile telephone is left when a predetermined time passes while the mobile telephone is left on the non-contact charging device after an accessory power source of the vehicle is turned off is proposed (see, for example, Japanese Patent Application Laid-Open No. 2013-38870).

SUMMARY

One or more embodiments of the present invention enable a mobile terminal such as a mobile telephone to adequately report when the mobile terminal receives an impact due to an accident of a vehicle.

In accordance with one or more embodiments of the present invention, a mobile terminal is a mobile terminal which can be charged by a charging device provided in a vehicle, and has: a set detecting unit which detects whether or not the mobile terminal is set on the charging device; an impact detecting unit which detects an impact on the mobile terminal; and a report unit which reports when the set detecting unit detects that the mobile terminal is set on the charging device and the impact detecting unit detects the impact, or when the set detecting unit detects that the mobile terminal is set on the charging device and then detects that the mobile terminal is not set on the charging device and the impact detecting unit detects the impact until a predetermined time passes.

The mobile terminal according to the one or more embodiments of the present invention reports when it is detected that the mobile terminal is set on the charging device provided in the vehicle and the impact on the mobile terminal is detected, or when it is detected that the mobile terminal is set on the charging device, then it is detected that the mobile terminal is not set on the charging device and the impact on the mobile terminal is detected until a predetermined time passes.

Consequently, the mobile terminal can adequately report when the mobile terminal receives the impact due to the accident of the vehicle.

This charging device is realized by, for example, a non-contact or contact charging device. This mobile terminal is realized by, for example, a high-tech mobile telephone such as a smartphone or a tablet. This set detecting unit is realized by, for example, a computing device such as a CPU. This impact detecting unit is realized by, for example, an impact sensor, a vibration sensor or an acceleration sensor. This report unit is realized by a computing device such as a CPU or a communication circuit which performs mobile communication.

This mobile terminal can further have a communication unit which performs near field communication with the charging device, and this charging device can wirelessly charge the mobile terminal and this set detecting unit can detect whether or not the mobile terminal is set on the charging device based on a state of the near field communication between the communication unit and the charging device.

Consequently, it is possible to easily charge the mobile terminal, and reliably detect that the mobile terminal is set on the charging device.

This communication unit is realized by, for example, a communication circuit which performs near field communication such as NFC (Near Field Communication), Bluetooth (registered trademark) or BLE (Bluetooth Low Energy).

The report unit can report in a state where an application program which reports is activated.

By this means, the mobile terminal can automatically report only by installing the application program in the mobile terminal.

The report unit can report to a predetermined report number through a mobile communication network.

By this means, it is possible to reliably automatically report using the mobile communication network.

In accordance with one or more embodiments of the present invention, a report control method is a report control method of a mobile terminal which can be charged by a charging device provided in a vehicle, and includes: set detecting step of detecting whether or not the mobile terminal is set on the charging device; impact detecting step of detecting an impact on the mobile terminal; and reporting step of reporting when it is detected that the mobile terminal is set on the charging device and the impact on the mobile terminal is detected, or when it is detected that the mobile terminal is set on the charging device, then it is detected that the mobile terminal is not set on the charging device and the impact on the mobile terminal is detected until a predetermined time passes.

According to the report control method according to the one or more embodiments of the present invention, reporting is performed when it is detected that the mobile terminal is set on the charging device provided in a vehicle and the impact on the mobile terminal is detected, or when it is detected that the mobile terminal is set on the charging device, then it is detected that the mobile terminal is not set on the charging device and the impact on the mobile terminal is detected until a predetermined time passes.

Consequently, the mobile terminal can adequately report when the mobile terminal receives an impact due to the accident of the vehicle.

This charging device is realized by, for example, a non-contact or contact charging device. This mobile terminal is realized by, for example, a high-tech mobile telephone such as a smartphone or a tablet. These set detecting step and reporting step are executed by, for example, a computing device such as a CPU. This impact detecting step is executed by, for example, an impact sensor, a vibration sensor or an acceleration sensor.

In accordance with one or more embodiments of the present invention, a program is a program which is executed by a mobile terminal which can be charged by a charging device provided in a vehicle, and causes the mobile terminal to execute processing including: set detecting step of detecting whether or not the mobile terminal is set on the charging device; and report controlling step of reporting when it is detected that the mobile terminal is set on the charging device and the impact on the mobile terminal is detected, or when it is detected that the mobile terminal is set on the charging device, then it is detected that the mobile terminal is not set on the charging device and the impact on the mobile terminal is detected until a predetermined time passes.

According to the program according to one or more embodiments of the present invention, reporting is performed when it is detected that the mobile terminal is set on the charging device provided in the vehicle and the impact on the mobile terminal is detected, or when it is detected that the mobile terminal is set on the charging device, then it is detected that the mobile terminal is not set on the charging device and the impact on the mobile terminal is detected until a predetermined time passes.

Consequently, the mobile terminal can adequately report when the mobile terminal receives an impact due to the accident of the vehicle.

This charging device is realized by, for example, a non-contact or contact charging device. This mobile terminal is realized by, for example, a high-tech mobile telephone such as a smartphone or a tablet.

In accordance with one or more embodiments of the present invention, a report system is a report system which has: a mobile terminal; and a charging device which can charge the mobile terminal and which is provided in a vehicle, and the mobile terminal includes: a set detecting unit which detects whether or not the mobile terminal is set on the charging device; an impact detecting unit which detects an impact on the mobile terminal; and a report unit which reports when the set detecting unit detects that the mobile terminal is set on the charging device and the impact detecting unit detects the impact, or when the set detecting unit detects that the mobile terminal is set on the charging device and then detects that the mobile terminal is not set on the charging device and the impact detecting unit detects the impact until a predetermined time passes, and the charging device includes a charge unit which charges the mobile terminal.

The report system according to one or more embodiments of the present invention reports when it is detected that the mobile terminal is set on the charging device provided in the vehicle and the impact on the mobile terminal is detected, or when it is detected that the mobile terminal is set on the charging device, then it is detected that the mobile terminal is not set on the charging device and the impact on the mobile terminal is detected until a predetermined time passes.

Consequently, the mobile terminal can adequately report when the mobile terminal receives the impact due to the accident of the vehicle.

This mobile terminal is realized by, for example, a high-tech mobile telephone such as a smartphone or a tablet. This charging device is realized by, for example, a non-contact or contact charging device. This set detecting unit is realized by, for example, a computing device such as a CPU. This impact detecting unit is realized by, for example, an impact sensor, a vibration sensor or an acceleration sensor. This report unit is realized by a computing device such as a CPU or a communication circuit which performs mobile communication.

This mobile terminal can further have a first communication unit which can perform near field communication with the charging device, this charging device can further have a second communication unit which can perform near field communication with the first communication unit, this set detecting unit can detect whether or not the mobile terminal is set on the charging device based on a state of the near field communication between the first communication unit and the second communication unit, and this charge unit can wirelessly charge the mobile terminal.

Consequently, it is possible to easily charge the mobile terminal, and reliably detect that the mobile terminal is set on the charging device.

These first communication unit and second communication unit are realized by, for example, communication circuits which perform near field communication such as NFC (Near Field Communication), Bluetooth (registered trademark) or BLE (Bluetooth Low Energy).

According to one or more embodiments of the mobile terminal alone can automatically report an accident of a vehicle. Particularly, according to one or more embodiments of the present invention, the mobile terminal can adequately report when the mobile terminal receives an impact due to an accident of the vehicle.

DETAILED DESCRIPTION

Hereinafter, one or more embodiments for carrying out the present invention will be described.

[Configuration Example of Report System 1]

Figure 1:
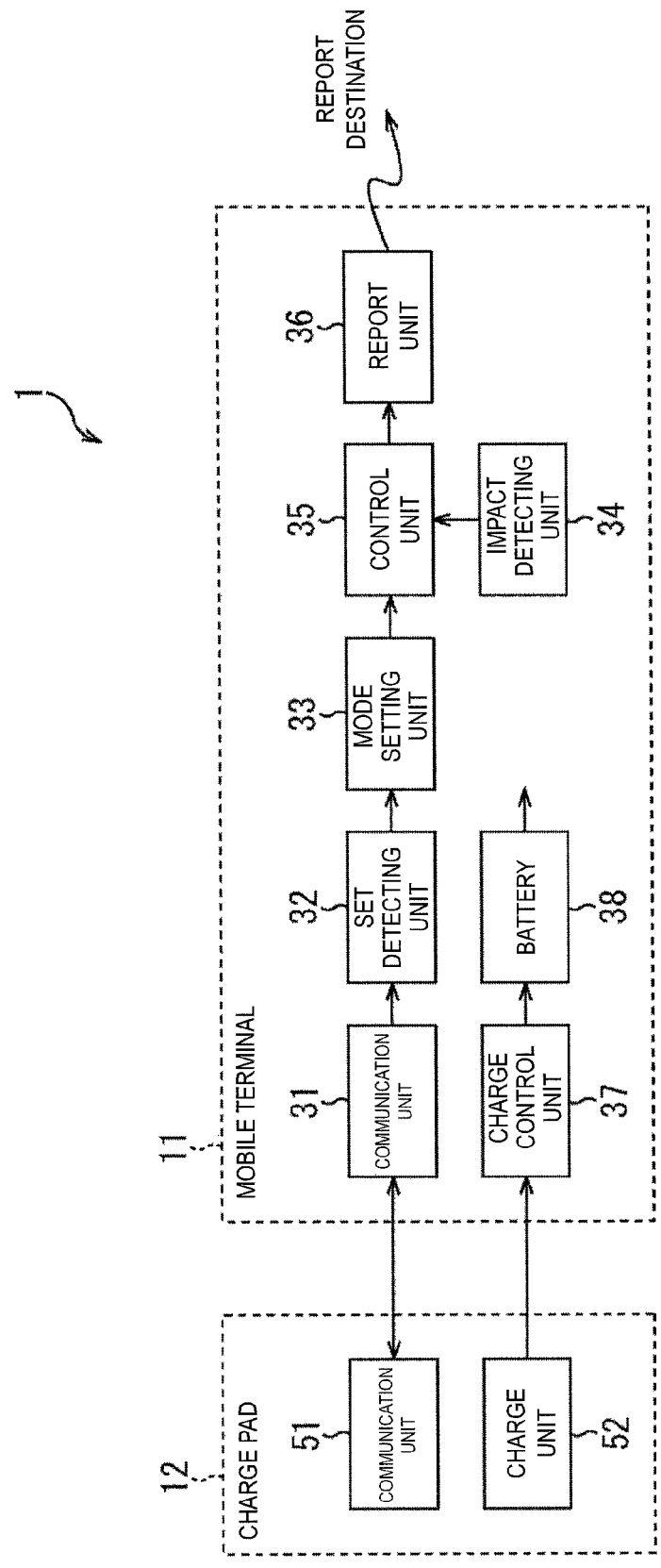
FIG. 1 is a block diagram illustrating a report system according to one or more embodiments.

FIG. 1 is a block diagram illustrating one or more embodiments of a report system 1 to which the present invention is applied.

The report system 1 is a system which is applied to a vehicle, and includes a mobile terminal 11 and a charge pad 12 which can wirelessly charge the mobile terminal 11. In addition, the report system 1 can be applied to arbitrary types of vehicles. Further, the charge pad 12 is installed in, for example, an interior of the vehicle to which the report system 1 is applied.

The mobile terminal 11 is configured by a mobile communication terminal such as a mobile telephone, a satellite telephone or a PHS which can perform mobile communication through a mobile communication network (for example, a mobile telephone network). More specifically, for example, the mobile terminal 11 is configured by a mobile telephone (including a smartphone or a PHS) or a tablet. Further, mobile communication performed by the mobile terminal 11 includes voice call and data communication.

The mobile terminal 11 includes a communication unit 31, a set detecting unit 32, a mode setting unit 33, an impact detecting unit 34, a control unit 35, a report unit 36, a charge control unit 37 and a battery 38.

The communication unit 31 performs near field communication such as NFC (Near Field Communication), Bluetooth (registered trademark) or BLE (Bluetooth Low Energy) with a communication unit 51 of the charge pad 12. Further, the communication unit 31 reports a communication state with the communication unit 51 of the charge pad 12, to the set detecting unit 32.

The set detecting unit 32 detects whether or not the mobile terminal 11 is set on the charge pad 12 based on the communication state between the communication unit 31 of the mobile terminal 11 and the communication unit 51 of the charge pad 12, and reports a detection result to the mode setting unit 33.

The mode setting unit 33 sets a report mode for determining whether or not to automatically report an accident of a vehicle, based on the detection result of the set detecting unit 32, and reports setting content to the control unit 35. The report mode includes two types of modes including an automatic report mode which activates an automatic report function and a normal mode which deactivates the automatic report function.

The automatic report mode refers to, for example, a state where a dedicated application program (referred to as an automatic report program below) which automatically reports is activated. Meanwhile, the normal mode refers to, for example, a state where the automatic report program is not activated, and refers to a normal use state of the mobile terminal 11. For example, the mode setting unit 33 sets the mobile terminal to the automatic report mode by activating the automatic report program, and sets the mobile terminal to the normal mode by stopping the automatic report program. Hence, the mobile terminal 11 automatically reports only in a state where the automatic report program is activated.

The impact detecting unit 34 is configured by, for example, a sensor such as an impact sensor, a vibration sensor or an acceleration sensor which can detect an impact, and detects an impact on the mobile terminal 11. The impact detecting unit 34 supplies sensor data which indicates a strength of the detected impact, to the control unit 35.

The control unit 35 determines whether or not there is a concern that the accident of the vehicle occurs, based on the detection result of the impact detecting unit 34. Further, the mobile terminal causes the report unit 36 to automatically report when the report unit 36 determines that there is a concern that the accident occurs and the mobile terminal is set to the automatic report mode.

The report unit 36 automatically reports the accident of the vehicle to a predetermined report destination (such as a call center) at which a report related to the accident of the vehicle is accepted, through the mobile communication network under control of the control unit 36.

In addition, the mobile terminal 11 reports to the report destination using an emergency report system through a mobile communication network such as e-Call.

The charge control unit 37 is realized by, for example, a charge circuit. The charge control unit 37 receives power supplied from a charge unit 52 of the charge pad 12 by way of electromagnetic induction and the like, and controls charging of the battery 38 using the received power.

The battery 38 supplies power which is necessary for an operation of each component of the mobile terminal 11.

The charge pad 12 includes the communication unit 51 and the charge unit 52.

The communication unit 51 performs predetermined near field communication with the communication unit 31 of the mobile terminal 11.

The charge unit 52 wirelessly supplies charging power to the mobile terminal 11.

[Processing of Report System 1]

Figure 2:
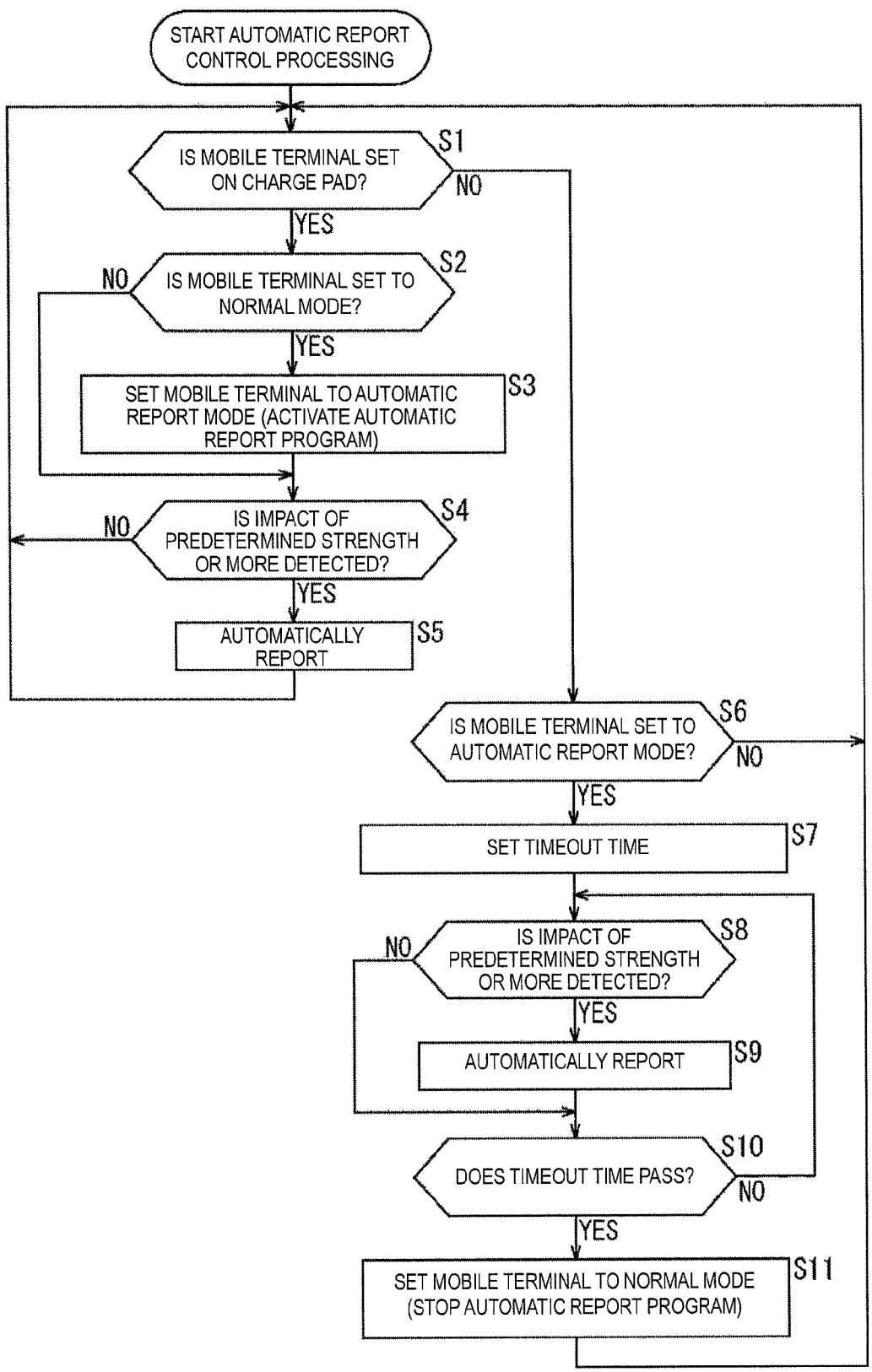
FIG. 2 is a flowchart for explaining automatic report control processing according to one or more embodiments.

Next, automatic report control processing executed by the mobile terminal 11 will be described with reference to a flowchart of FIG. 2.

In step S1, the set detecting unit 32 determines whether or not the mobile terminal is set on the charge pad 12. For example, the communication unit 51 of the charge pad 12 transmits polling signals at predetermined intervals. Further, when the mobile terminal 11 is set on the charge pad 12 and the communication unit 31 of the mobile terminal 11 receives the polling signal, wireless communication is subsequently established between the communication unit 31 and the communication unit 51 of the charge pad 12 according to a predetermined communication protocol.

Furthermore, the set detecting unit 32 determines that the mobile terminal is set on the charge pad 12 when the communication unit 31 establishes wireless communication with the communication unit 51 of the charge pad 12, and reports the determination result to the mode setting unit 33. Subsequently, processing moves to step S2.

In step S2, the mode setting unit 33 determines whether or not the mobile terminal is set to the normal mode. When it is determined that the mobile terminal is set to the normal mode, the processing moves to step S3.

In step S3, the mode setting unit 33 sets the mobile terminal to the automatic report mode. For example, the mode setting unit 33 sets the mobile terminal to the automatic report mode by activating the automatic report program. The mode setting unit 33 reports that the mobile terminal is set to the automatic report mode, to the control unit 35.

Subsequently, the processing moves to step S4.

Meanwhile, when it is determined in step S2 that the mobile terminal is already set to the automatic report mode, the processing in step S3 is skipped and the processing moves to step S4.

In step S4, the control unit 35 determines whether or not an impact of a predetermined strength or more is detected. More specifically, the control unit 35 determines that the impact of the predetermined strength or more is detected when the strength indicated by the sensor data supplied from the impact detecting unit 34 is a predetermined threshold or more, and the processing moves to step S5.

In addition, this threshold is set to a value which is suitable to detect an occurrence of the accident of the vehicle. For example, this threshold is set to a value larger than the strength of the impact which is assumed to be applied to the mobile terminal 11 when the mobile terminal 11 is removed from the charge pad 12 or when the mobile terminal 11 is dropped in the vehicle. Meanwhile, this threshold is set to a value lower than the strength of the impact which is assumed to be applied to the mobile terminal 11 when the accident of the vehicle occurs. Further, this threshold may be a fixed value or may be changed by a user. In addition, it is not necessary to set a threshold at all times to detect an impact which needs to be reported without using the strength of the impact.

In step S5, the report unit 36 automatically reports under control of the control unit 35. More specifically, the report unit 36 automatically reports that there is a concern that the accident of the vehicle occurs, to a predetermined report destination through the mobile communication network. That is, when the set detecting unit 32 detects that the mobile terminal is set on the charge pad 12 in step S1 and the impact detecting unit 34 detects an impact in step S4, the report unit 36 reports to a predetermined report destination.

In addition, in this case, the report unit 36 may report, and transmit position information of the vehicle acquired or held by the mobile terminal 11 and image data which indicates the state of the vehicle, to the report destination.

Subsequently, the processing returns to step S1, and the processing subsequent to step S1 is executed.

Meanwhile, when it is determined in step S4 that the impact of the predetermined strength or more is not detected, the processing returns to step S1. Subsequently, the processing subsequent to step S1 is executed.

Further, in step S1, when the communication unit 31 does not establish wireless communication with the communication unit 51 of the charge pad 12, the set detecting unit 32 determines that the mobile terminal is not set on the charge pad 12 and reports a determination result to the mode setting unit 33. Subsequently, the processing moves to step S6.

In step S6, the mode setting unit 33 determines whether or not the mobile terminal is set to the automatic report mode. When it is determined that the mobile terminal is set to the automatic report mode, the processing moves to step S7.

In step S7, the mode setting unit 33 sets a timeout time. That is, the mode setting unit 33 sets the timeout time of a timer which is not illustrated, to a predetermined value, and starts counting the timer.

In addition, the timeout time may be a fixed value or may be changed by the user.

In step S8, similar to the processing in step S4, whether or not the impact of the predetermined strength or more is detected is determined. When it is determined that the impact of the predetermined strength or more is detected, the processing moves to step S9.

In step S9, the mobile terminal automatically reports similar to the processing in step S5. That is, when the set detecting unit 32 detects in step S1 that the mobile terminal is set on the charge pad 12 and detects in subsequent step S1 that the mobile terminal is not set on the charge pad and the impact detecting unit 34 detects the impact in step S8 until a predetermined time (timeout time) passes, the report unit 36 reports to the predetermined report destination.

Subsequently, the processing moves to step S10.

Meanwhile, when it is determined in step S8 that the impact of the predetermined strength or more is not detected, the processing in step S9 is skipped and the processing moves to step S10.

In step S10, the mode setting unit 33 determines whether or not the timeout time passes. When it is determined that the timeout time does not pass, the processing returns to step S8, and the processing in steps S8 to S10 is then repeatedly executed until it is determined in step S10 that the timeout time passes.

Meanwhile, when it is determined in step S10 that the timeout time passes, the processing moves to step S11.

In step S11, the mode setting unit 33 sets the mobile terminal to the normal mode. For example, the mode setting unit 33 sets the mobile terminal to the normal mode by stopping execution of the automatic report program. The mode setting unit 33 reports that the mobile terminal is set to the normal mode, to the control unit 35.

Subsequently, the processing returns to step S1, and the processing subsequent to step S1 is executed.

Meanwhile, when it is determined in step S6 that the mobile terminal is already set to the normal mode, the processing returns to step S1, and the processing subsequent to step S1 is executed.

When, for example, the mobile terminal 11 alone automatically reports, if the above processing is not performed, it is necessary to set the mobile terminal 11 to the automatic report mode when the user gets on the vehicle or set the mobile terminal 11 to the normal mode when the user gets off the vehicle. However, this setting operation is bothersome for the user and is easily forgotten. Further, when changing the setting is forgotten, the mobile terminal does not automatically report when the accident occurs or the mobile terminal automatically reports by mistake when the mobile terminal 11 is dropped outside the vehicle.

By contrast with this, when, for example, the charge pad 12 is installed in the vehicle, the user is supposed to set the mobile terminal 11 on the charge pad 12 to charge the battery 38 as a normal operation when the user gets on the vehicle. Particularly when the mobile terminal 11 is, for example, a smartphone whose battery 38 decreases fast, the user is highly likely to set the mobile terminal 11 on the charge pad 12. Further, as illustrated in a view on a left side of FIG. 3, the mobile terminal 11 is set to the automatic report mode only by setting the mobile terminal 11 on the charge pad 12. Furthermore, when the user gets off the vehicle, the mobile terminal can be set to the normal mode only by removing the mobile terminal 11 from the charge pad 12. Thus, it is possible to prevent setting or cancelation of the automatic report mode from being forgotten or prevent that the mobile terminal does not automatically report when necessary or that the mobile terminal automatically reports when unnecessary.

Figure 3:
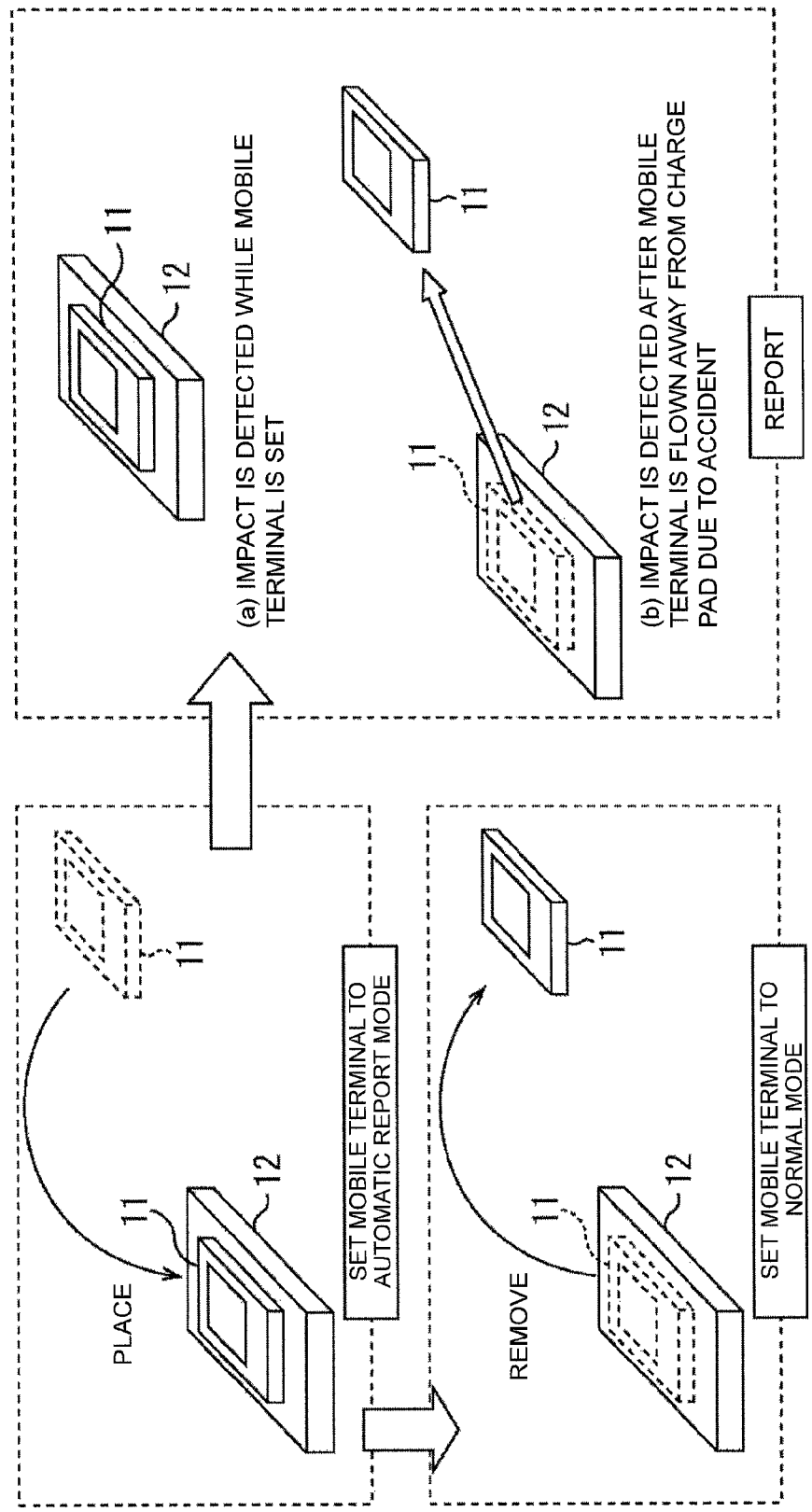
FIG. 3 is a view for explaining a flow of the automatic report control processing according to one or more embodiments.

Further, as indicated by (a) in FIG. 3, when the impact of the predetermined strength or more is detected in a state where the mobile terminal 11 is set on the charge pad 12, the mobile terminal automatically reports. Furthermore, as indicated by (b) in FIG. 3, when, for example, after the mobile terminal 11 is thrown away from the charge pad 12 due to the impact of the accident, the mobile terminal collides in the vehicle, is thrown out of the vehicle or collides against a ground, the impact of the predetermined strength or more is detected in some cases. Even in these cases, a time lag is provided until the mobile terminal is set to the normal mode, so that the mobile terminal reliably automatically reports. This time lag corresponds to the timeout time set in step S7 in FIG. 2.

Thus, when the mobile terminal 11 is set on the charge pad 12, and the accident of the vehicle occurs, the mobile terminal can reliably automatically report. Meanwhile, when the mobile terminal 11 is not set on the charge pad 12 and is carried by the user, even if a strong impact is applied to the mobile terminal 11 since the mobile terminal is dropped outside the vehicle, it is possible to prevent the mobile terminal from automatically reporting by mistake.

One or more additional embodiments of the present invention will now be described.

Although a mobile terminal 11 detects that the mobile terminal is set on a charge pad 12, based on a state of wireless communication with the charge pad 12 above, another detecting method can also be adopted. For example, it is possible to detect that the mobile terminal is set on the charge pad, based on whether or not power is supplied from a charge unit 52 of the charge pad 12.

Further, the present invention can also adopt a contact charging device. In this case, whether or not the mobile terminal 11 is set on the charging device can be determined depending on whether or not a terminal or a connector of the charging device is connected to the charging terminal of the mobile terminal 11. Alternatively, the mobile terminal 11 and the charging device may perform wired communication to determine whether or not the mobile terminal 11 is set on the charging device based on a state of wired communication.

Further, when, for example, the mobile terminal 11 is removed from the charge pad 12 upon an end of automatic report (when, for example, the mobile terminal automatically reports after the mobile terminal 11 is removed from the charge pad 12 or when the mobile terminal 11 is removed from the charge pad 12 during automatic report), the mobile terminal may be returned to the normal mode at one of the following timings.

When, for example, the timeout time does not pass upon the end of automatic report, the mobile terminal may be returned to the normal mode after the timeout time passes, and, when the timeout time already passes upon the end of automatic report, the mobile terminal may be returned to the normal mode upon the end of automatic report.

Alternatively, for example, the mobile terminal may be returned to the normal mode after the end of automatic report.

Alternatively, according to a specification that a report destination of automatic report gives a callback, the mobile terminal may be returned to the normal mode after the report destination finishes the callback.

Alternatively, when the report destination commands to stop an automatic report program on the mobile terminal 11 and the automatic report program is stopped according to this command, the mobile terminal may be returned to the normal mode.

Further, the mobile terminal 11 and the report destination can communicate by way of mobile communication through a base station and, in addition, can also communicate through a network such as the Internet through a wireless router by way of WiFi.

[Configuration Example of Computer]

The above series of processing can be executed by hardware or can be executed by software. When the series of processing are executed by the software, a program which configures this software is installed in the mobile terminal 11 and is executed by a computer which is implemented on the mobile terminal 11.

Further, the program to be executed by the computer can be provided by being recorded in a removable medium such as a package medium. Furthermore, the program can be provided through a wired or wireless transmission medium such as a local area network, the Internet or digital satellite broadcasting.

In addition, the program can be installed in advance in a ROM or a storage unit.

In addition, the program to be executed by the computer may be a program which performs processing in time series in order described in this description, or may be a program which performs processing in parallel or at a necessary timing at which the program is invoked.

Further, in this description, the system refers to a set of a plurality of components (devices and modules (parts)), and whether or not all components are not provided in a single housing does not matter. Consequently, a plurality of devices accommodated in different housings and connected through a network, or one device in which a plurality of modules is accommodated in one housing are both systems.

Further, one or more embodiments of the present invention are not limited to the above embodiment, and can be variously modified in a range which does not deviate from the spirit of the present invention.

Furthermore, each step described according to the above flowchart can be executed by one device and, in addition, be shared and executed by a plurality of devices.

Still further, when a plurality of processing is included in one step, a plurality of processing included in this one step can be executed by one device or, in addition, be shared and executed by a plurality of devices.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A mobile terminal which can be charged by a charging device provided in a vehicle, the mobile terminal comprising:
   a set detecting unit which detects whether or not the mobile terminal is set on the charging device;
   an impact detecting unit which detects an impact on the mobile terminal; and
   a report unit which reports when the set detecting unit detects that the mobile terminal is set on the charging device and the impact detecting unit detects the impact, or when the set detecting unit detects that the mobile terminal is set on the charging device and then detects that the mobile terminal is not set on the charging device and the impact detecting unit detects the impact until a predetermined time passes.

2. The mobile terminal according to claim 1, further comprising a communication unit which performs near field communication with the charging device, wherein
   the charging device wirelessly charges the mobile terminal, and
   the set detecting unit detects whether or not the mobile terminal is set on the charging device based on a state of the near field communication between the communication unit and the charging device.

3. The mobile terminal according to claim 1, wherein the report unit reports in a state where an application program which reports is activated.

4. The mobile terminal according to claim 1, wherein the report unit reports to a predetermined report destination through a mobile communication network.

5. The mobile terminal according to claim 2, wherein the report unit reports in a state where an application program which reports is activated.

6. The mobile terminal according to claim 2, wherein the report unit reports to a predetermined report destination through a mobile communication network.

7. The mobile terminal according to claim 3, wherein the report unit reports to a predetermined report destination through a mobile communication network.

8. A report control method of a mobile terminal which can be charged by a charging device provided in a vehicle, the report control method comprising:

set detecting step of detecting whether or not the mobile terminal is set on the charging device;

impact detecting step of detecting an impact on the mobile terminal; and reporting step of reporting when it is detected that the mobile terminal is set on the charging device and the impact on the mobile terminal is detected, or when it is detected that the mobile terminal is set on the charging device, then it is detected that the mobile terminal is not set on the charging device and the impact on the mobile terminal is detected until a predetermined time passes.

9. A non-transitory computer readable medium comprising computer readable program code, which when executed by a mobile terminal which can be charged by a charging device provided in a vehicle and which can detect an impact, the program causes the mobile terminal to:

set detecting step of detecting whether or not the mobile terminal is set on the charging device; and report controlling step of reporting when it is detected that the mobile terminal is set on the charging device and the impact on the mobile terminal is detected, or when it is detected that the mobile terminal is set on the charging device, then it is detected that the mobile terminal is not set on the charging device and the impact on the mobile terminal is detected until a predetermined time passes.

10. A report system comprising:

a mobile terminal; and a charging device which can charge the mobile terminal and which is provided in a vehicle, wherein the mobile terminal includes:

a set detecting unit which detects whether or not the mobile terminal is set on the charging device;

an impact detecting unit which detects an impact on the mobile terminal; and a report unit which reports when the set detecting unit detects that the mobile terminal is set on the charging device and the impact detecting unit detects the impact, or when the set detecting unit detects that the mobile terminal is set on the charging device and then detects that the mobile terminal is not set on the charging device and the impact detecting unit detects the impact until a predetermined time passes, and the charging device includes a charge unit which charges the mobile terminal.

11. The report system according to claim 10, wherein the mobile terminal further includes a first communication unit which can perform near field communication with the charging device, the charging device further includes a second communication unit which can perform near field communication with the first communication unit, the set detecting unit detects whether or not the mobile terminal is set on the charging device based on a state of the near field communication between the first communication unit and the second communication unit, and the charge unit wirelessly charges the mobile terminal.

* * * * *